United States Patent [19]

Okuma

[11] Patent Number: 5,156,685
[45] Date of Patent: Oct. 20, 1992

[54] COMBUSTION PROMOTER FOR INTERNAL COMBUSTION ENGINES

[76] Inventor: Takeshi Okuma, 29-1 Central, Yokohama City, Kanakawa Ken, Japan

[21] Appl. No.: 635,602
[22] PCT Filed: May 18, 1987
[86] PCT No.: PCT/JP87/00312
§ 371 Date: Dec. 28, 1990
§ 102(e) Date: Dec. 28, 1990
[87] PCT Pub. No.: WO88/09430
PCT Pub. Date: Dec. 1, 1988
[51] Int. Cl.$^5$ .............................. F02P 23/00
[52] U.S. Cl. ............................. 123/143 A; 123/193.6
[58] Field of Search .......... 123/143 R, 143 A, 143 B, 123/193 P, 73 B, 73 BA

[56] References Cited

U.S. PATENT DOCUMENTS

| | | | |
|---|---|---|---|
| 973,651 | 10/1910 | Haberkorn | 123/143 A |
| 1,515,562 | 11/1924 | Enssle | 123/143 A |
| 1,860,673 | 5/1932 | Jackson | 123/78 B |
| 2,222,440 | 11/1940 | Nawman | 123/143 A |
| 2,394,269 | 2/1946 | Svete | 123/78 B |
| 3,038,458 | 6/1962 | Mansfield | 123/78 B |
| 4,610,226 | 9/1986 | Okuma | 123/143 A |
| 4,617,887 | 10/1986 | Nagase et al. | 123/193 P |

FOREIGN PATENT DOCUMENTS

| | | |
|---|---|---|
| 61-1609 | 3/1979 | Japan . |
| 54-38422 | 3/1979 | Japan . |
| 54-42513 | 4/1979 | Japan .............................. 123/193 P |
| 58-163633 | 10/1983 | Japan . |
| 60-36722 | 2/1985 | Japan . |
| 2223292 | 4/1990 | United Kingdom ............ 123/193 P |

*Primary Examiner*—David A. Okonsky
*Attorney, Agent, or Firm*—Spencer, Frank & Schneider

[57] ABSTRACT

A combustion promoter for an internal combustion engine comprising a cylinder having a combustion chamber therein, a main piston movable within the cylinder, a sub-piston mounted on an inner wall of the main piston, and a sub-cylinder surrounding the projecting portion of the sub-piston and defining a sub-cylinder chamber. The sub-piston is driven in relation to the stroke of the main piston toward the combustion chamber until the main piston has reached a position in the vicinity of top dead center of a compression stroke. Gas in the combustion chamber is then introduced into the sub-cylinder chamber where it is stored. The sub-piston is next moved rapidly away from the combustion chamber to eject the gas stored in the sub-cylinder chamber into the combustion chamber, thereby promoting combustion of the gas.

2 Claims, 2 Drawing Sheets

COMBUSTION PROMOTER FOR INTERNAL COMBUSTION ENGINES

BACKGROUND OF THE INVENTION

This invention relates to a device which promotes firing in internal combustion engines. More specifically, it relates to a device which promotes firing in the cylinders of internal combustion engines such as gasoline and diesel engines.

There are known devices which promote firing in internal combustion engines by providing an orifice system which intakes a uniform previously mixed fuel and air mixture through openings in an inside wall of a cylinder. Swirl is thereby produced during the intake stroke. However, the opening and closing mechanism is complicated an consequently an effective swirl is not obtained before firing has begun.

This invention provides a comparatively simple device which promotes firing to produce swirl at the beginning of firing in the combustion chamber of an internal combustion engine.

SUMMARY OF THE INVENTION

The present invention is a combustion promoter for an internal combustion engine which comprises a cylinder having a combustion chamber therein, a main piston movable within the cylinder, a sub-piston mounted on an inner wall of the main piston, and a sub-cylinder surrounding a projecting portion of the sub-piston and defining a sub-cylinder chamber. The sub-piston is driven in relation to the stroke of the main piston toward the combustion chamber until the main piston has reached a position in the vicinity of top dead center of the compression stroke. Gas in the combustion chamber is then introduced into the sub-cylinder chamber where it is stored. The sub-piston is next moved rapidly away from the combustion chamber to eject the gas stored in the sub-cylinder chamber into the combustion chamber, thereby promoting combustion of the gas.

Ejection of the gas stored in the sub-cylinder chamber causes a swirl to occur in the gas which has just started combustion. Consequently, firing effects are improved remarkably.

DESCRIPTION OF THE PREFERRED EMBODIMENT

Figure 1:
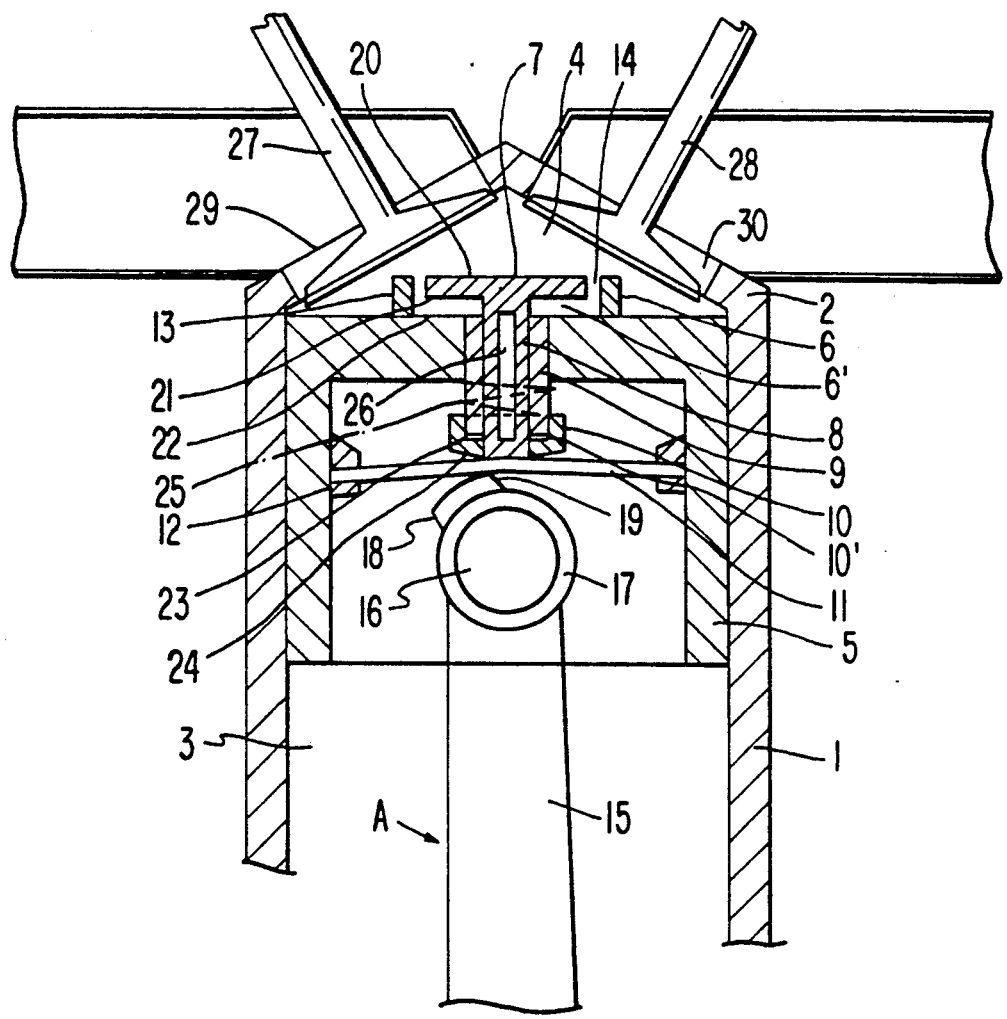
FIG. 1 is a sectional view showing a first embodiment of a cylinder of an internal combustion engine constructed in accordance with this invention.

FIG. 1 shows a first embodiment of my invention wherein 1 is a cylinder wall, 2 is a cylinder head, 3 is a cylinder chamber, 4 is a combustion chamber, 5 is a main piston, 6 is a gas saving blasting device, 7 is a sub-piston of the gas saving blasting device 6, 8 is a piston rod of the sub-piston 7, 9 is a piston rod guide for the sub-piston 7, 10 is an oil damper, 10' is a small hole in the bottom part of the oil damper, 11 is a spring plate, 12 is a support for the spring plate, 13 is a sub-cylinder wall of the blasting device 6, 6' is a sub-cylinder chamber defined by the sub-piston 7 and the sub-cylinder wall 13, 14 is a clearance between the sub-piston 7 and the sub-cylinder wall 13, 14' (FIG. 2) is a plurality of small holes in a face 20 of the sub-piston 7, 15 is a connecting rod, 16 is a piston pin, 17 is a piston pin holder of the connecting rod, 18 is a cam, 19 is the back face of the cam 18, 21 is a back face of the sub-piston 7, 23 is an oil damper compression chamber, 24 is a spherical face of the sub-piston rod 8, 25 is a spring interposed between the inside upper wall of the main piston 5 and the head of the sub-piston rod 8, 26 is a cavity within the sub-piston rod, 27 is an inlet valve of the combustion chamber 4, 28 is an exhaust valve of the combustion chamber 4, 29 is an intake opening, and 30 is an exhaust opening.

The embodiment of my invention shown in FIGS. 1 and 2 operates as follows. When the main piston 5 reaches a position in the vicinity of top dead center of the compression stroke, the cam 18 mounted on the piston pin holder 17 and which is synchronized with the stroke of the main piston, pushes the head 24 of the sub-piston rod 8 in the upward direction, via the spring plate 11, against the force exerted by spring 25. This causes the sub-piston 7 to rise into the combustion chamber 4 when the main piston 5 reaches top dead center. Consequently, a thin mixture of air and gas is introduced into the sub-cylinder chamber 6' through clearance 14 where it is entrapped before and after the main piston reaches top dead center due to the action of connecting rod 15.

When firing takes place, the sub-piston rod 8 and sub-piston 7 are suddenly moved downward assisted by the force exerted by spring 25. This motion forces the gas stored in the sub-cylinder chamber 6' through the holes 14' in the face 20 of sub-piston 7 and the clearance 14 into combustion chamber 4 thereby causing a swirl in the gas which has just started combustion. Sub-piston 7 is then moved upward into sub-cylinder 13 by the difference in pressure between that in the sub-cylinder chamber 6' and on the back face 21 of the sub-piston 7.

The cavity 26 within the sub-piston rod 8 reduces the weight of sub-piston 7 permitting rapid upward movement of the sub-piston. Movement of the oil damper 10 during the return trip causes lubricating oil to be mixed with air in the cylinder chamber 3 and reduce the shock inherent in the return motion. Moreover, lubricating oil from the compression chamber 23 is forced under pressure by the oil damper 10 through the clearance between the rod 8 of the sub-piston 7 and the guide 9.

Figure 3:
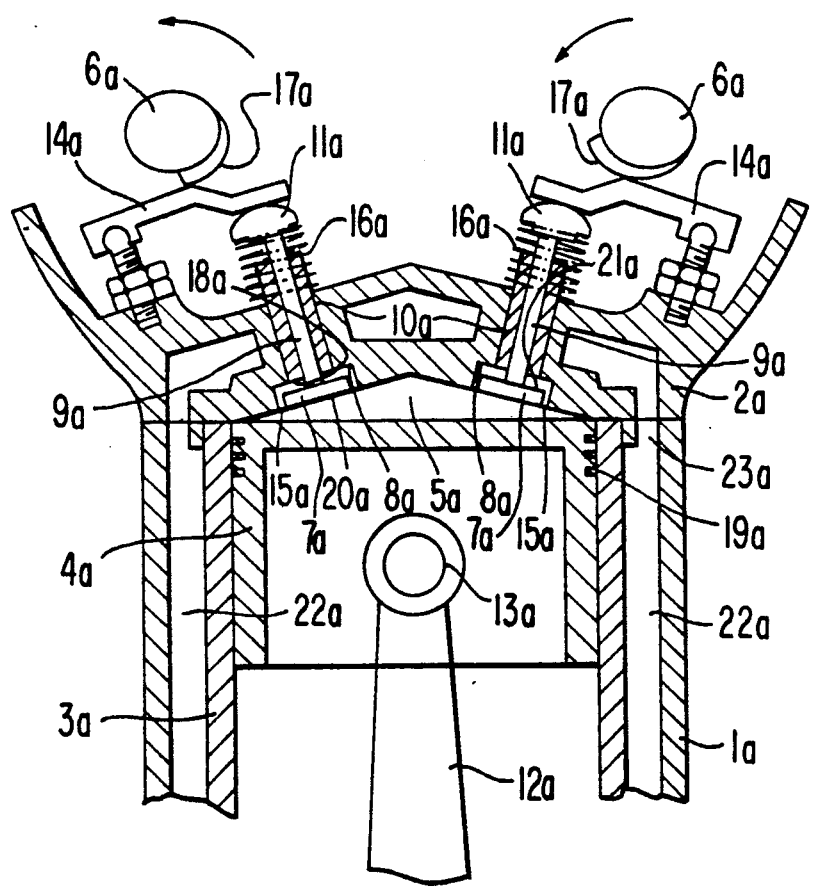
FIG. 3 is a sectional view showing a second embodiment of the invention.

FIG. 3 illustrates a second embodiment of the invention. In FIG. 3, 1a is a cylinder block, 2a is a cylinder head, 3a is a cylinder, 4a is a main piston, 5a is a combustion chamber, 6a is a cam, 7a is a sub-piston of a blasting device, 8a is a sub-cylinder chamber of the blasting device, 9a is a rod of the sub-piston, 10a is a guide of the sub-piston, 11a is a rod head of the sub-piston, 12a is a connecting rod, 13a is a piston pin, 14a is a rocker arm, 15a is an orifice for saving gas, 16a is a spring, 17a is a projection of cam 6a, 18a is the inside wall of sub-cylinder 7a, 19a is a piston ring, 20a is a sub-piston surface, 21a is a sub-piston back face and 22a is a cooling chamber. Cam 6a is driven by a separate connecting cam or drive shaft of the internal combustion engine.

Figure 2:
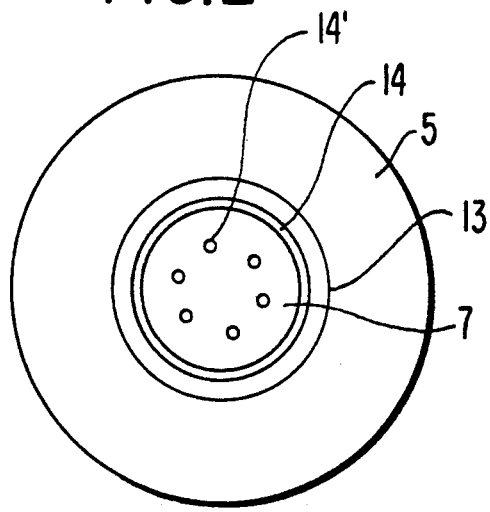
FIG. 2 is a top view of the pistons incorporated in the engine of FIG. 1.

The embodiment shown in FIG. 3 operates in substantially the same way as the embodiment shown in FIGS. 1 and 2. Namely, timing is established in synchronism with the main piston 4a. The projection 17a on the cam 6a pushes sub-piston 7a into the combustion chamber 5a by means of rocker arm 14a, and the mixing of fuel and air occurs in the sub-cylinder chamber 8a.

Gas under pressure is transmitted to the combustion chamber 5a through orifice 15a in the sub-cylinder chamber 8a of the blasting device. Upon reaching the before and after upper dead points which includes the upper dead point itself, the projection 17 on cam 6a is suddenly effected, sub-piston 7a moves into the sub-cylinder chamber 8a by the force of spring 16a, and gas in the sub-cylinder chamber 8a is forced into the combustion chamber through orifice 15a thereby producing swirl. In other forms of this example, the timing of the two sets of cams 6a, 6a can be adjusted to produce swirl more effectively.

As previously mentioned, the gas introduced and saved in the sub-cylinder chamber is blasted into the combustion chamber before and after the upper dead point including when the upper dead point is reached. As a result, firing in the combustion chamber is remarkably promoted, strong swirl is produced and firing is obtained at high temperatures with thin fuel thereby achieving high efficiency, high pressure ratio, lower cost of fuel, and lower public hazard. In a diesel system internal combustion engine, strong swirl and an effect similar to that achieved in gasoline engines is obtained.

I claim:

1. A combustion promoter for an internal combustion engine comprising
    a cylinder having a combustion chamber therein;
    a main piston movable within said cylinder;
    a sub-piston mounted on an inner wall of said main piston, said sub-piston having a portion projecting into said combustion chamber; and
    a sub-cylinder surrounding the projecting portion of said sub-piston and defining a sub-cylinder chamber, said sub-piston being driven in relation to the stroke of said main piston toward said combustion chamber until said main piston has reached a position in the vicinity of top dead center of a compression stroke, gas in said combustion chamber being introduced into said sub-cylinder chamber and stored therein, said sub-piston being then moved rapidly away from said combustion chamber to eject the gas stored in said sub-cylinder chamber into said combustion chamber, thereby promoting combustion of the gas.

2. A combustion promoter as defined by claim 1 which further comprises a connecting rod having a piston pin holder and cam attached thereto, and wherein said sub-piston has a rod driven by said cam and an upper face surrounded by said sub-cylinder.

* * * * *